3,703,568
CHLOROPRENE RUBBER COMPOSITION
Takashi Kadowaki, Kenji Itoyama, and Shoya Matsuzawa, Ohmi-machi, Japan, assignors to Denki Kagaku Kogyo Kabushiki Kaisha, Tokyo, Japan
No Drawing. Filed Sept. 17, 1970, Ser. No. 73,174
Claims priority, application Japan, Sept. 24, 1969, 44/75,364
Int. Cl. C08f 29/12
U.S. Cl. 260—890         3 Claims

ABSTRACT OF THE DISCLOSURE

Chloroprene rubber composition consisting mainly of a mixture of 100 parts by weight of chloroprene polymer and 0.1 to 20 parts by weight of polyvinyl alcohol. The chloroprene rubber composition can be used alone as an adhesive. An adhesive composition having a more excellent stability against layer separation is obtained by adding a metal oxide, and a modified phenol resin and conventional additives to the rubber composition.

BACKGROUND OF THE INVENTION

Field of the invention

The present invention relates to a chloroprene rubber composition and a method of producing the same, more particularly to an adhesive composition having an excellent stability against layer separation and a method of producing the same.

Description of the prior art

The generally known chloroprene rubber adhesive has the following composition. Namely a masticated polychloroprene is added with a modified phenol resin and a metal oxide such as magnesium oxide and zinc oxide to form a homogeneous compound. Separately, an organic solvent (alone or in admixture) is mixed and reacted with a modified phenol resin and a metal oxide. The thus formed two mixtures are mixed and stirred at room temperature to form a homogeneous adhesive composition. The thus formed chloroprene series adhesive may be used immediately but in many cases said adhesive is used after storage for a given period and sometimes such an adhesive is stored for several months. In this case, such an adhesive separates frequently into an upper layer containing mainly a transparent or opaque solvent and a lower layer containing mainly the metal oxide and the like in the storage. If such a layer separation once occurs, when the adhesive is used, such an adhesive must be again dispersed homogeneously by stirring and other means, but this operation is troublesome and particularly when a large amount of adhesive is handled, such operation is very hard and difficult. Accordingly, adhesive compositions, which do not cause such layer separation and have an excellent composition stability, have been demanded.

The following means for preventing layer separation have been previously proposed.

(1) Variation of processing conditions: For example, chloroprene rubber is masticated and then dissolved in a solvent or magnesium oxide is reacted with a modified phenol resin fully in a solvent and then a chloroprene rubber compound is dissolved therein (U.S. Patent No. 3,044,976).

(2) Use of a particular additive: 2 to 3% by weight based on the adhesive composition of water is added or 1 to 40 phr. of an organic acid having at least one carboxyl group is added to said adhesive composition (U.S. Patent No. 3,185,658). Alternatively No. 3,185,658). Alternatively, 0.05 to 1.0 phr. of tri functional isocyanate is added thereto (U.S. Patent No. 3,318,834).

(3) Use of considerably finely divided zinc oxide or use of a solvent mixed with a proper amount of aromatic or chlorinated solvent.

These means have not been able to prevent the layer separation satisfactorily for some adhesive compositions and further these operations are troublesome and other physical properties may be deteriorated. Accordingly, a further improvement has been desired.

SUMMARY OF THE INVENTION

The inventors have found that an adhesive prepared by using a modified rubber obtained by adding a given amount of polyvinyl alcohol (including completely saponified product and partially saponified product abbreviated as "PVA" hereinafter) in the production step of chloroprene rubber can improve the stability against the layer separation considerably without substantially decreasing the adhesivity and the present invention has been established.

DESCRIPTION OF THE PREFERRED EMBODIMENTS

The PVA to be used in the present invention is preferred to have a polymerization degree of about 500 to 3,000 and a saponification value of 50 to 100%. The particularly preferable polymerization degree is less than 2,500, because such a PVA is easily dissolved in water. The preferable saponification value is about 70 to 90%. When the saponification value is lower than 70%, the water solubility is low and when the saponification value is higher than 90%, such PVA is dissolved with difficulty and is difficult in use.

For obtaining a homogeneous mixture of chloroprene rubber and PVA in the present invention, it is most preferable to mix an aqueous solution of PVA with chloroprene rubber emulsion (abridged as "latex" hereinafter) homogeneously.

Then the time for adding PVA will be explained hereinafter. An aqueous solution of PVA previously prepared is added to an unpurified latex, in which unreacted monomer remains after the polymerization, and the resulting mixture is stirred for a given time, after which the remaining monomer is removed.

In the other process, the purified latex, in which the unreacted monomer has been removed, is added with an aqueous solution of PVA in the same manner as described above.

Alternatively, prior to the polymerization of chloroprene, a given amount of PVA is dissolved in an aqueous solution of a soap and then chloroprene is emulsified therein, after which the polymerization is effected or during the polymerization an aqueous solution of PVA is added to the polymerization reaction system and the polymerization is continued. However, in this case the viscosity may increase during the polymerization depending upon the composition of the aqueous solution of soap to be used for emulsification of chloroprene and the addition amount must be taken into consideration.

Furthermore, the concentration of the aqueous solution of PVA is not more than 50% by weight. If the concentration is too low, the concentration of latex is diluted, while if the concentration is too high, the viscosity of the aqueous solution becomes too high and the handling is difficult. Accordingly, the preferable concentration is 5 to 30% by weight.

In addition, if instead of the aqueous solution of PVA, powdery PVA is directly added to the latex and the resulting mixture is stirred for a given time, PVA is dissolved in the latex homogeneously to attain the same effect. As mentioned above, any means which can dissolve PVA in latex homogeneously, can attain the object of the present invention.

The amount of PVA added apparently improves the stability against layer separation in 0.1 PHR and as the amount increases, the tendency appears more apparently. Several ten PHR may be added, but in chloroprene rubber adhesive an organic solvent is usually used and consequently when the addition amount is too large, although the addition amount varies more or less depending upon the composition of the solvent, PVA cannot be homogeneously dispersed in the adhesive composition and said PVA partially precipitates. In general, about 20 phr. is the upper limit that can disperse PVA homogeneously and the object of the present invention can be fully attained by such an addition amount.

The thus obtained rubber composition can be used alone as an adhesive, but an adhesive composition having a more excellent stability against layer separation can be obtained by adding a modified phenol resin, metal oxide and conventionally used additives to the above described rubber composition and then dissolving the resulting mixture in an organic solvent.

The stability against layer separation of these rubber compositions was estimated by the following process.

Namely, 100 parts by weight of the above described modified rubber was masticated on rolls and 2 phr. of an antioxidant of styrenated phenol and 4 phr. of magnesium oxide as a metal oxide and 5 phr. of zinc oxide were added thereto to prepare a homogeneous compound. Separately, 435 phr. of the mixed solvents and 30 phr. of the modified phenol resins as described in the following Table 1 and 4 phr. of magnesium oxide were mixed and the resulting mixture was reacted at room temperature for more than 8 hours. Into the reaction product was introduced the formerly prepared compound and the resulting mixture was stirred at room temperature to obtain a homogeneous dispersion, which was tested as a sample.

This sample was charged in a glass tube having a diameter of 2 cm. and a length of 20 cm. in such an amount that the height of the sample was 12 cm. and the open end of the tube was corked and the glass tube was left to stand at room temperature. After 60 days, when a layer separation of more than 1 cm. is observed the upper layer portion, this is regarded as the occurrence of layer separation. The number of samples in which the layer separation did not occur was counted with respect to the total number (18 tubes) of test samples of adhesive obtained by combination of the solvents and modified phenol resins as described in the following Table 1, and, for example, when the layer separation was not observed in 15 tubes among 18 tubes, the stability against the layer separation was estimated as 15 point.

As mentioned above, the stability against layer separation probably varies depending upon various conditions but by effecting the compounding in a common manner and selecting the combination of the solvent and the modified phenol resin which most influences the layer separation as in the following Table 1, the stability against the layer separation was tested by 18 kinds of adhesives with respect to each modified rubber. The mixed solvents in Table 1 are liable to cause layer separation.

TABLE 1.—COMBINATION OF SOLVENT AND MODIFIED PHENOL RESIN IN THE TEST OF THE STABILITY AGAINST LAYER SEPARATION

| Modified phenol resin | Solvent | | | | | |
|---|---|---|---|---|---|---|
| | 1 | 2 | 3 | 4 | 5 | 6 |
| A | | | | | | |
| B | | | | | | |
| C | | | | | | |

Note.—In the above Table 1, the modified phenol resins A, B and C are as follows:
A = CKR 1634 modified phenol resin, made by Union Carbide International Co., U.S.A.
B = SP-126 modified phenol resin, made by Schenectady Chemical Co., U.S.A.
C = SP-134 modified phenol resin, made by Schenectady Chemical Co., U.S.A.

The following mixed solvents 1 to 6 are prepared by mixing each component in the equal amount by volume:
1 = Toluene, ethyl acetate and methyl ethyl ketone.
2 = Toluene, ethyl acetate and n-hexane.
3 = Toluene, methyl ethyl ketone and n-hexane.
4 = Toluene, gasoline and acetone.
5 = Toluene, gasoline and ethyl acetate.
6 = Ethyl acetate, methyl ethyl ketone and cyclohexane.

The following examples are given in illustration of this invention and are not intended as limitations thereof.

Example 1.—To a chloroprene rubber purified latex obtained by a conventional manner was added a 10% aqueous solution of a PVA having a saponification value of 88% and a polymerization degree of 600 in such an amount that 0.1, 4 or phr. of the PVA was added to said latex. The resulting mixture was stirred for 24 hours at room temperature and then finished by a conventional manner to obtain a modified rubber. At the same time, a chloroprene rubber containing no PVA was produced.

Stability against layer separation of the resulting modified rubber was evaluated according to the above described process, and it was found that the stability against layer separation of the rubber containing no PVA was 5 point, that of the modified rubber added with 0.1 phr. of the PVA was 7 point, that of the modified rubber added with 4 phr. of the PVA was 17 point, and that of the modified rubber added with 10 phr. of the PVA was 18 point.

Example 2.—To the same purified latex as used in Example 1 were added 4 phr. of a PVA having a saponification value of 99.5% and a polymerization degree of 600 in the same manner as described in Example 1 to obtain a modified rubber. The modified rubber had a stability of 15 point.

Example 3.—To the same purified latex as used in Example 1 were added 4 phr. of a PVA having a saponification value of 75% and a polymerization degree of 600 in the same manner as described in Example 1 to obtain a modified rubber. The modified rubber had a stability of 10 point.

Example 4.—To the same purified latex as used in Example 1 were added 4 phr. of a PVA having a saponification value of 88% and a polymerization degree of 2,400 in the same manner as described in Example 1 to obtain a modified rubber. The modified rubber had a stability of 16 point.

Example 5.—To the same purified latex as used in Example 1 were added 4 phr. of a powdery PVA having a saponification value of 88% and a polymerization degree of 600 while stirring. The resulting mixture was further stirred for 24 hours at room temperature and then finished by a conventional manner to obtain a modified rubber. The modified rubbed had a stability of 17 point.

Example 6.—A PVA having a saponification value of 88% and a polymerization degree of 600 was dissolved in an aqueous solution of a soap in such an amount that the resulting rubber contained 1 phr. of the PVA, and then chloroprene monomer was emulsified in the PVA solution. The resulting emulsion was polymerized by a conventional manner. After unreacted monomer was removed, the polymerization product was finished to obtain a modified rubber. The modified rubber had a stability of 10 point.

Example 7.—A 10% aqueous solution of a PVA having a saponification value of 88% and a polymerization degree of 600 was added to an unpurified chloroprene latex in such an amount that 4 phr. of the PVA was added to the latex. After chloroprene monomer was removed by a conventional manner, the resulting mixture was stirred for 24 hours at room temperature and then finished by a conventional manner to obtain a modified rubber. The modified rubber had a stability of 17 point.

Reference example.—Peeling adhesivity and tack retention time of the modified chloroprene rubber adhesive composition containing PVA according to the present invention and those of the chloroprene rubber adhesive composition containing no PVA were determined to obtain a result as shown in the following Table 2. Table 2 shows that the peeling adhesivity and the tack retention time of the adhesive composition containing PVA according to the present invention are substantially the same with those of the adhesive composition containing no PVA.

TABLE 2

| | Compounding recipe | Test method | Amount of PVA added (phr.) | | | |
|---|---|---|---|---|---|---|
| | | | Not added | 0.1 | 4 | 10 |
| Peeling adhesivity at room temperature (kg./2.5 cm.) | (1) | (A) | 24.4 | 24.1 | 21.0 | 23.5 |
| | (3) | (A) | 30.0 | 29.1 | 27.5 | 28.4 |
| Peeling adhesivity at high temperature (kg./2.5 cm.) | (2) | (B) | 4.2 | 4.2 | 5.0 | 4.7 |
| | (3) | (B) | 4.5 | 4.1 | 4.8 | 4.2 |
| Peeling adhesivity in water (kg./2.5 cm.) | (1) | (C) | 24.8 | 23.5 | 25.5 | 24.3 |
| Tack retention time (hour) | (2) | (D) | 17.6 | 19.4 | 23.0 | 25.3 |

The compounding recipe of the chloroprene rubber adhesive composition and the test method used in the above Table 2 are as follows:

Compounding recipe (1): Parts by weight
Polychloroprene _____ 100
Styrenated phenol(Nocrac Sp [1]) _____ 2
Magnesia _____ 4
Zinc oxide _____ 5
Solvent 2 _____ 333

[1] Made by Ouchishinko Kagaku Kogyo Co.

Compounding recipe (2): Parts by weight
Polychloroprene _____ 100
Styrenated phenol(Nocrac SP) _____ 2
Magnesia _____ 8
Zinc oxide _____ 5
Modified phenol resin A _____ 30
Solvent 2 _____ 435

Compounding recipe (3): Parts by weight
Polychloroprene _____ 100
Styrenated phenol(Nocrac SP) _____ 5
Magnesia _____ 8
Zinc oxide _____ 5
Silica (Nipsil VN$_3$ [2]) _____ 10
Modified phenol resin A _____ 50
Solvent 2 _____ 480

Test method (A).—Two cotton canvases (Hard Texture 10, Commercial Designation, ASTM, part 24, D 230) were applied with a chloroprene rubber composi-

[2] Made by Nappon Silica Kogyo Co.

tion. After 20 minutes, the two canvases were adhered together and dried for 5 days at room temperature. Then, a test sample having an adhered portion of 25 mm. width and 70 mm. length and a holding portion (the two canvases of this portion are not adhered) of 25 mm. width and 45 mm. length was prepared.

The test sample was heated at 70° C. for 20 minutes to effect decrystallization, and then left to stand for 24 hours at 25° C. to obtain a test piece. A peeling test was effected with respect to the test piece at room temperature. In the peeling test, the test piece was nipped at its two holding portions by means of a peeling tester and peeled at an angle of 180° and a velocity of 50 mm./min., whereby the peeling adhesivity of the chloroprene rubber composition was determined.

Test method (B).—The test piece prepared in the test method (A) was used, and the peeling adhesivity of a chloroprene rubber composition at 60° C. was determined.

Test method (C).—The test piece prepared in the test method (A) was dipped in pure water at 25° C. for 24 hours, and the peeling adhesivity of a chloroprene rubber composition was determined in a wet state.

Test method (D).—Commercially available cellophane papers for packing were applied with an adhesive composition in such an amount that the thickness of the adhesive composition after two papers are adhered and dried becomes 0.06 to 0.08 mm. Two of the papers were adhered to each other at regular intervals of time. The adhered cellophane papers samples were dried for 5 days at room temperature. Then, the adhered cellophane papers wre peeled slowly by hands. The time until the area of portions where both the cellophanes have been adhered, becomes about 10% of the total area applied with the adhesive composition, was regarded as the tack retention time, and the average value of 5 tests was determined.

What is claimed is:
1. Chloroprene rubber composition consisting essentially of a mixture of 100 parts by weight of polychloroprene and 0.1 to 20 parts by weight of polyvinyl alcohol having a polymerization degree of 500 to 3,000 and a saponification value of 50 to 100%.

2. The chloroprene rubber composition of claim 1 wherein the polyvinyl alcohol has a saponification value of from 70 to 90%.

3. The chloroprene rubber composition of claim 1 wherein the polymerization degree of the polyvinyl alcohol is less than 2500.

References Cited

UNITED STATES PATENTS

| 2,194,350 | 3/1940 | Berg _____ 260—32 |
| 2,277,259 | 3/1942 | Schnabel _____ 260—4 |
| 2,400,612 | 5/1946 | Sprague _____ 260—42 |

MURRAY TILLMAN, Primary Examiner

C. J. SECCURO, Assistant Examiner

U.S. Cl. X.R.

260—31.2 MR, 32.8 A, 33.6 A, 41.5 A, 41.5 R, 45.95, 845